United States Patent [19]

Pearson

[11] Patent Number: 4,505,850

[45] Date of Patent: Mar. 19, 1985

[54] STABILIZERS FOR VINYL RESINS

[75] Inventor: Derek G. Pearson, Whitley Bay, England

[73] Assignee: Associated Lead Manufacturers Limited, Newcastle-upon-Tyne, England

[21] Appl. No.: 594,953

[22] Filed: Apr. 2, 1984

Related U.S. Application Data

[63] Continuation of Ser. No. 434,254, Oct. 14, 1982, abandoned.

[30] Foreign Application Priority Data

Oct. 23, 1981 [GB] United Kingdom ............... 8132058

[51] Int. Cl.$^3$ ................................. C09K 3/28
[52] U.S. Cl. ................... 252/609; 106/18.19; 252/601; 260/429 R; 260/435 R; 260/448 R; 521/85; 521/107
[58] Field of Search ............... 252/609, 8.05; 106/18.11, 18.14, 18.31, 18.19; 521/85, 107, 108; 260/429 R, 435 R, 448 R, 931, 438.1

[56] References Cited

U.S. PATENT DOCUMENTS

| | | | |
|---|---|---|---|
| 3,826,762 | 7/1974 | Treadwell | 252/609 |
| 3,849,368 | 11/1974 | Anderson et al. | 252/609 |
| 3,892,577 | 7/1975 | Sagahara et al. | 106/18.11 |
| 3,953,650 | 4/1976 | Sauer et al. | 252/609 |
| 4,083,789 | 4/1978 | Morgan et al. | 106/18.19 |
| 4,133,823 | 1/1979 | Joyce et al. | 260/439 R |
| 4,206,133 | 6/1980 | Joyce et al. | 260/429.7 |
| 4,260,542 | 4/1981 | Joyce et al. | 106/18.19 |
| 4,278,483 | 7/1981 | Mansolillo | 427/201 |
| 4,313,761 | 2/1982 | Joyce et al. | 106/18.19 |
| 4,387,176 | 6/1983 | Frye | 106/18.11 |

FOREIGN PATENT DOCUMENTS

| | | |
|---|---|---|
| 917082 | 1/1963 | United Kingdom . |
| 1147253 | 4/1969 | United Kingdom . |
| 1208748 | 10/1970 | United Kingdom ............... 252/609 |
| 1255267 | 12/1971 | United Kingdom . |

*Primary Examiner*—Stephen J. Lechert, Jr.
*Assistant Examiner*—Howard J. Locker
*Attorney, Agent, or Firm*—Watson, Cole, Grindle & Watson

[57] ABSTRACT

The fire hazard associated with the use of dibasic lead phosphite as a stabilizer for vinyl resins is reduced by mixing with the dibasic lead phosphite an additive selected from hydroxides or hydrated oxides of aluminium, magnesium or antimony, stearates of barium or calcium, dibasic lead stearate and carbonates of calcium or magnesium.

8 Claims, No Drawings

STABILIZERS FOR VINYL RESINS

This application is a continuation of application Ser. No. 434,254, filed Oct. 14, 1982, now abandoned.

BACKGROUND OF THE INVENTION

Dibasic lead phosphite has the formula $2PbOPbHPO_3 \cdot \frac{1}{2}H_2O$ and is used as a stabilizer for vinyl resins, e.g., polyvinyl chloride (P.V.C.), against weathering, i.e., it provides protection against U.V. radiation and mild thermal excitation. Stabilization is achieved by the presence of both basic lead and phosphite groups (anti-oxidant) on the molecule.

Unfortunately the presence of both groups causes the material to be heat sensitive, and two exothermic reactions occur:

(i) $2PbOPbHPO_3 \rightarrow PbOPbHPO_4 + Pb$. 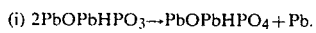

(ii) $2Pb + O_2\text{(atmosphere)} \rightarrow 2PbO$. 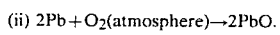

As can be seen, reaction (i) does not require atmospheric oxygen and in practice once ignition occurs, a fire is difficult to extinguish. Inert atmospheres have been used in an attempt to achieve this. While this appears to have extinguished the fire, on re-exposure to air the strongly exothermic reaction (ii) re-generates the fire. The only known method of effectively extinguishing a dibasic lead phosphite fire is to reduce the temperature to below the initiation temperature of reaction (i) and this is achieved by dowsing the fire with water. Dibasic lead phosphite is usually coated with a water repellant coating to aid its dispersibility into P.V.C. and to prevent reactions with atmospheric carbon dioxide and moisture on storage, and this renders it difficult to wet the burning powder with water. Fires have been reported during manufacture, during storage and on a lorry carrying dibasic lead phosphite following a road accident.

Because of the fire hazard, dibasic lead phosphite powder is classified under 4:1 inflammable solids according to the Department of Trade and Industry and is required to be packed in 'effectively closed' packages. This in the United Kingdom means packaging in metal drums, which are costly. In addition, a test method and classification is being considered by the United Nations Secretariat Committee of experts on the Transport of Dangerous Goods.

The ignition temperature for reaction (i) is difficult to quantify as the temperature is dependent on time and weight. For instance, a sample can ignite after five hours at 300° C. and fail to ignite after 10 seconds at 400° C., and a small sample can ignite and self-extinguish from a burning cigarette, whereas a large sample can burn vigorously under the same conditions.

Consequently, two tests have been used to assess the fire hazard, a hot surface applied to the powder (ignition temperature) and the rate of burning once ignition has started (propagation test). This latter test is particularly relevant to storage in the hold of a ship as slow burning rates can allow fire fighting equipment to be brought to the scene of the fire. The U.K. classification allows a maximum burning rate of 66 mm/min. and the proposed U.N. classification allows a maximum of 100 mm/min. This latter classification is considered by some experts to be too high and it may be reduced to the U.K. limit.

The above tests are as follows:

Propagation Test

A 20×10 mm. cross section×250 mm. length pile of powder is made using a metal former. The former is removed and the powder ignited at one end by means of an incandescent wire. When the fire has progressed 50 mm., the time for a further 100 mm. is taken and the rate is calculated.

Ignition Temperature

A 2 mm. thick thermocouple probe is heated in a flame to a temperature in excess of the test temperature. As the probe cools to the test temperature the probe is applied to a 10 gram heap of powder for 15 seconds. If ignition occurs, the test is carried out on a fresh sample at a lower temperature. If ignition does not occur, the powder is re-tested at a higher temperature. The result is taken when the ignition occurs at a temperature 10° C. above that at which ignition does not occur.

SUMMARY OF THE INVENTION

The present invention is based on the discovery that by addition to the dibasic lead phosphite powder of certain materials which are compatible with P.V.C., the temperature of a phosphite fire can be so reduced that the fire self-extinguishes or burns at a slow rate.

It provides a stabilizer for vinyl resins which consists of a mixture of dibasic lead phosphite and an additive selected from hydroxides or hydrated oxides of aluminium, magnesium or antimony, stearates of barium or calcium, dibasic lead stearate and carbonates of calcium or magnesium, the additive being present in an amount sufficient to give a fire propagation rate not exceeding 100 mm/min.

The mixture can be formed by coprecipitation with the dibasic lead phosphate during the course of manufacture or by blending the additive with the dibasic lead phosphite powder.

Such a mixture can be shipped in bags and is less subject to fires during handling and storage than dibasic lead phosphite containing no such additives. The mechanism of the invention is based on the fact that the additives have strong or weak endothermic reactions occurring above 120° C. and below 450° C. which counteract the exothermic reaction (1).

EXAMPLES

(i) Coprecipitate Formation 219 gms. of litharge are mixed with 1500 ccs. of water at 60° C. 1.2 gms. of acetic acid catalyst are added and 27 gms. of phosphorous acid dissolved in 50 ccs. of water are added over a period of 30 minutes. The resulting white slurry is stirred for 15 minutes and the required amount of additive is added to the slurry (12 gms. for 5% addition). 1 gm. of stearic acid is dissolved in 3 gms. of dioctyl phthalate plasticizer and the liquid is added to the slurry. The treated solids are filtered and dried at 100° C. and then ground to a fine powder.

(ii) Mixture Formation

A coated dibasic lead phosphite powder is prepared without additives as above and blended in a laboratory mixer with the required amount of powdered additive.

The coprecipitates and mixtures were assessed for fire risk according to the table below in which M denotes a mixture and C a coprecipitate.

| Example | Additive (Coprecipitate or mixture) | | | Fire Propagation Rate | Ignition Temperature |
| --- | --- | --- | --- | --- | --- |
| 1. | None | | — | 120 mm/min. | 500° C. |
| 2. | 10% | Aluminium Hydroxide | M | Nil | above 900° C. |
| | 7% | Aluminium Hydroxide | M | Self-extinguished | 600° C. |
| | 5% | Aluminium Hydroxide | M | 23 mm/min. | 550° C. |
| | 2% | Aluminium Hydroxide | M | 50 mm/min. | 530° C. |
| 3. | 15% | Aluminium Hydroxide | C | Nil | above 900° C. |
| | 10% | Aluminium Hydroxide | C | 15 mm/min. | 600° C. |
| | 5% | Aluminium Hydroxide | C | 35 mm/min. | 550° C. |
| | 2% | Aluminium Hydroxide | C | 58 mm/min. | 500° C. |
| 4. | 10% | Magnesium Hydroxide | M | Nil | above 900° C. |
| | 5% | Magnesium Hydroxide | M | Nil | above 900° C. |
| | 2% | Magnesium Hydroxide | M | 38 mm/min. | 600° C. |
| 5. | 10% | Magnesium Hydroxide | C | Nil | above 900° C. |
| | 5% | Magnesium Hydroxide | C | 30 mm/min. | 600° C. |
| | 2% | Magnesium Hydroxide | C | 45 mm/min. | 600° C. |
| 6. | 40% | Calcium Stearate | M | 5 mm/min. | 800° C. |
| | 25% | Calcium Stearate | M | 14 mm/min. | 500° C. |
| | 10% | Calcium Stearate | M | 40 mm/min. | 500° C. |
| | 5% | Calcium Stearate | M | 58 mm/min. | 500° C. |
| 7. | 30% | Calcium Stearate | C | Nil | above 900° C. |
| | 20% | Calcium Stearate | C | 14 mm/min. | 550° C. |
| | 10% | Calcium Stearate | C | 50 mm/min. | 500° C. |
| 8. | 30% | Calcium Carbonate | M | 18 mm/min. | 550° C. |
| | 30% | Calcium Carbonate | C | 18 mm/min. | 550° C. |
| | 20% | Calcium Carbonate | M | 30 mm/min. | 550° C. |
| | 10% | Calcium Carbonate | M | 38 mm/min. | 550° C. |
| 9. | 15% | Dibasic Lead Stearate | M | 15 mm/min. | 550° C. |
| | 15% | Dibasic Lead Stearate | C | 15 mm/min. | 550° C. |
| | 10% | Dibasic Lead Stearate | M | 50 mm/min. | 550° C. |
| | 5% | Dibasic Lead Stearate | M | 71 mm/min. | 550° C. |
| 10. | 25% | Hydrated Antimony Pentoxide | M | 15 mm/min. | 700° C. |
| | 25% | Hydrated Antimony Pentoxide | C | 15 mm/min. | 700° C. |
| | 20% | Hydrated Antimony Pentoxide | M | 25 mm/min. | 550° C. |
| | 5% | Hydrated Antimony Pentoxide | M | 40 mm/min. | 550° C. |
| | 2% | Hydrated Antimony Pentoxide | M | 62 mm/min. | 500° C. |
| 11. | 20% | Barium Stearate | M | 4 mm/min. | 600° C. |
| | 20% | Barium Stearate | C | 8 mm/min. | 600° C. |
| | 10% | Barium Stearate | M | 10 mm/min. | 500° C. |
| | 5% | Barium Stearate | M | 20 mm/min. | 500° C. |
| | 2% | Barium Stearate | M | 63 mm/min. | 500° C. |
| 12. | 20% | Magnesium Carbonate | M | Nil | above 900° C. |
| | 20% | Magnesium Carbonate | C | Nil | above 900° C. |
| | 10% | Magnesium Carbonate | M | Self-extinguished | 800° C. |
| | 5% | Magnesium Carbonate | M | 10 mm/min. | 500° C. |
| | 2% | Magnesium Carbonate | M | 43 mm/min. | 500° C. |

I claim:

1. In a dibasic lead phosphite-containing stabilizer composition which can be mixed with vinyl resins so as to protect the vinyl resins against weathering, the improvement wherein said stabilizer composition includes 2 to 40% by weight, based on the total weight of the stabilizer composition, of an additive ingredient selected from the group consisting of hydroxides and hydrated oxides of aluminum, magnesium and antimony, and carbonates of calcium and magnesium, said additive ingredient functioning to reduce the danger of ignition of the dibasic lead phosphite and said stabilizer composition during manufacture, transport and storage and to reduce the fire propagation rate of said stabilizer composition to 100 mm/min or less.

2. A stabilizer composition according to claim 1, which consists of a physical mixture of dibasic lead phosphite powder and said additive ingredient.

3. A stabilizer composition according to claim 1, which consists of a coprecipitate of said dibasic lead phosphite and said additive ingredient.

4. A stabilizer composition according to claim 1, in which said additive ingredient is 2-15% by weight of aluminum hydroxide.

5. A stabilizer composition according to claim 1, in which said additive ingredient is 2-10% by weight of magnesium hydroxide.

6. A stabilizer composition according to claim 1, in which said additive ingredient is 10-30% by weight of calcium carbonate.

7. A stabilizer composition according to claim 1, in which said additive ingredient is 2-25% by weight of hydrated antimony pentoxide.

8. A stabilizer composition according to claim 1, in which said additive ingredient is 2-20% by weight of magnesium carbonate.

* * * * *